United States Patent
Tavakoli et al.

(10) Patent No.: US 10,497,090 B2
(45) Date of Patent: Dec. 3, 2019

(54) SYSTEMS AND METHODS FOR REDUCING MEMORY BANDWIDTH VIA MULTIVIEW COMPRESSION/DECOMPRESSION

(71) Applicant: QUALCOMM INCORPORATED, San Diego, CA (US)

(72) Inventors: Mehrad Tavakoli, San Diego, CA (US); Moinul Khan, San Jose, CA (US); Mriganka Mondal, San Diego, CA (US); Raghavendra Nagaraj, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/596,989

(22) Filed: May 16, 2017

(65) Prior Publication Data

US 2018/0336659 A1 Nov. 22, 2018

(51) Int. Cl.
*G06F 13/14* (2006.01)
*G06T 1/60* (2006.01)
(Continued)

(52) U.S. Cl.
CPC ............... *G06T 1/60* (2013.01); *G06T 1/20* (2013.01); *G06T 7/97* (2017.01); *G06T 9/00* (2013.01);
(Continued)

(58) Field of Classification Search
CPC ............... H04N 19/597; H04N 13/161; H04N 2213/007; H04N 13/122; H04N 19/00; H04N 21/816; H04N 13/189; H04N 13/275; H04N 2013/0074; G06T 19/00; G06T 9/007
See application file for complete search history.

(56) References Cited

U.S. PATENT DOCUMENTS 8,451,320 B1 * 5/2013 Cole .................... H04N 19/597
348/43
9,143,758 B2 9/2015 Tchoukaleysky
(Continued)

OTHER PUBLICATIONS

Ho Y-S., et al., "Overview of Multi-view Video Coding," Systems, Signals and Image Processing, 2007 and 6th EURASIP Conference Focused on Speech and Image Processing, 14th International Workshop on Multimedia Communications and Services, Jun. 1, 2007, pp. 5-12, XP031159489.
(Continued)

*Primary Examiner* — Hau H Nguyen
(74) *Attorney, Agent, or Firm* — Smith Tempel Blaha LLC

(57) ABSTRACT

Systems, methods, and computer programs are disclosed for reducing memory bandwidth via multiview compression/decompression. One embodiment is a compression method for a multiview rendering in a graphics pipeline. The method comprises receiving a first image and a second image for a multiview rendering. A difference is calculated between the first and second images. The method compresses the first image and the difference between the first and second images. The compressed first image and the compressed difference are stored in a memory. The compressed first image and the compressed difference are decompressed. The second image is generated by comparing the first image to the difference.

24 Claims, 6 Drawing Sheets

(51) Int. Cl.

| | | |
|---|---|---|
| *G06T 1/20* | (2006.01) | |
| *G06T 9/00* | (2006.01) | |
| *G06T 15/00* | (2011.01) | |
| *G06T 19/00* | (2011.01) | |
| *G06T 7/00* | (2017.01) | |
| *H04N 19/597* | (2014.01) | |
| *H04N 19/156* | (2014.01) | |
| *H04N 19/20* | (2014.01) | |
| *H04N 19/51* | (2014.01) | |
| *H04N 19/423* | (2014.01) | |
| *H04N 19/436* | (2014.01) | |

(52) U.S. Cl.
CPC ............ *G06T 15/00* (2013.01); *G06T 19/006* (2013.01); *H04N 19/156* (2014.11); *H04N 19/20* (2014.11); *H04N 19/51* (2014.11); *H04N 19/597* (2014.11); *G06T 2210/08* (2013.01); *G06T 2219/028* (2013.01); *H04N 19/423* (2014.11); *H04N 19/436* (2014.11)

(56) References Cited

U.S. PATENT DOCUMENTS

| | | | |
|---|---|---|---|
| 9,204,123 B2 | 12/2015 | Vrbas et al. | |
| 9,319,657 B2 | 4/2016 | Kang et al. | |
| 9,367,890 B2* | 6/2016 | Choi | H04N 5/44 |
| 2010/0013843 A1* | 1/2010 | Ameline | G06T 1/60 |
| | | | 345/522 |
| 2015/0116468 A1* | 4/2015 | Au | H04N 13/04 |
| | | | 348/54 |
| 2015/0195506 A1 | 7/2015 | Lin et al. | |
| 2016/0086379 A1 | 3/2016 | Sadi et al. | |
| 2017/0344107 A1* | 11/2017 | Aghara | G06F 3/013 |
| 2018/0053284 A1* | 2/2018 | Rodriguez | G06T 5/006 |

OTHER PUBLICATIONS

International Search Report and Written Opinion—PCT/US2018/032543—ISA/EPO—dated Jul. 16, 2018.
Puri A., et al., "Compression of Stereoscopic Video Using MPEG-2," Proceedings of the SPIE, vol. 10282, Oct. 25, 1995, pp. 102820H-1 to 102820H-26, XP060094414, pp. 319-325.

* cited by examiner

_US 10,497,090 B2_

SYSTEMS AND METHODS FOR REDUCING MEMORY BANDWIDTH VIA MULTIVIEW COMPRESSION/DECOMPRESSION

DESCRIPTION OF THE RELATED ART

Existing virtual reality (VR) and augmented reality (AR) computer systems employ a sophisticated graphics pipeline or rendering pipeline. The graphics pipeline generally comprises the hardware and/or software components for performing the sequence of steps used to create a two-dimensional raster representation of a three-dimensional scene. Once a three-dimensional model has been created by, for example, a video game or other VR or AR application, the graphics pipeline performs the process of turning the three-dimensional model into the two-dimensional raster representation scene for display to the user. The two-dimensional raster representation includes a multiview rendering comprising a separate rendering for the left and right eyes.

In many VR/AR systems, the graphics pipeline comprises a graphics processing unit (GPU), a double data rate (DDR) memory, and a display processor. The GPU generates the left and right eye views. Each view is separately compressed before storing in the DDR memory for subsequent pipeline processing (e.g., time warping, display processing, etc.). During further processing by the GPU or the display processor, each view is retrieved from the DDR memory, separately decompressed, and then processed. Where timewarping is performed to improve motion-to-photon latency, the separate timewarped left and right views are again compressed and stored in the DDR memory for subsequent decompression and processing by the display processor.

While existing graphics pipeline compression techniques in VR/AR systems can significantly reduce DDR memory bandwidth and power consumption, there remains a need for further reducing memory bandwidth and power consumption.

SUMMARY OF THE DISCLOSURE

Systems, methods, and computer programs are disclosed for reducing memory bandwidth via multiview compression/decompression. One embodiment is a compression method for a multiview rendering in a graphics pipeline. The method comprises receiving a first image and a second image for a multiview rendering. A difference is calculated between the first and second images. The method compresses the first image and the difference between the first and second images. The compressed first image and the compressed difference are stored in a memory. The compressed first image and the compressed difference are decompressed. The second image is generated by comparing the first image to the difference.

Another embodiment is a computer system for compressing/decompressing a multiview rendering in a graphics pipeline. The computer system comprises a double data rate (DDR) memory, a multiview compression module, and a multiview decompression module. The multiview compression module comprises logic configured to: calculate a difference between a first image and a second image for a multiview rendering; compress the first image and the difference between the first and second images; and store the compressed first image and the compressed difference between the first and second images. The multiview decompression module comprises logic configured to: decompress the compressed first image and the compressed difference stored in the DDR memory; and generate the second image by comparing the first image to the difference.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," "engine", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
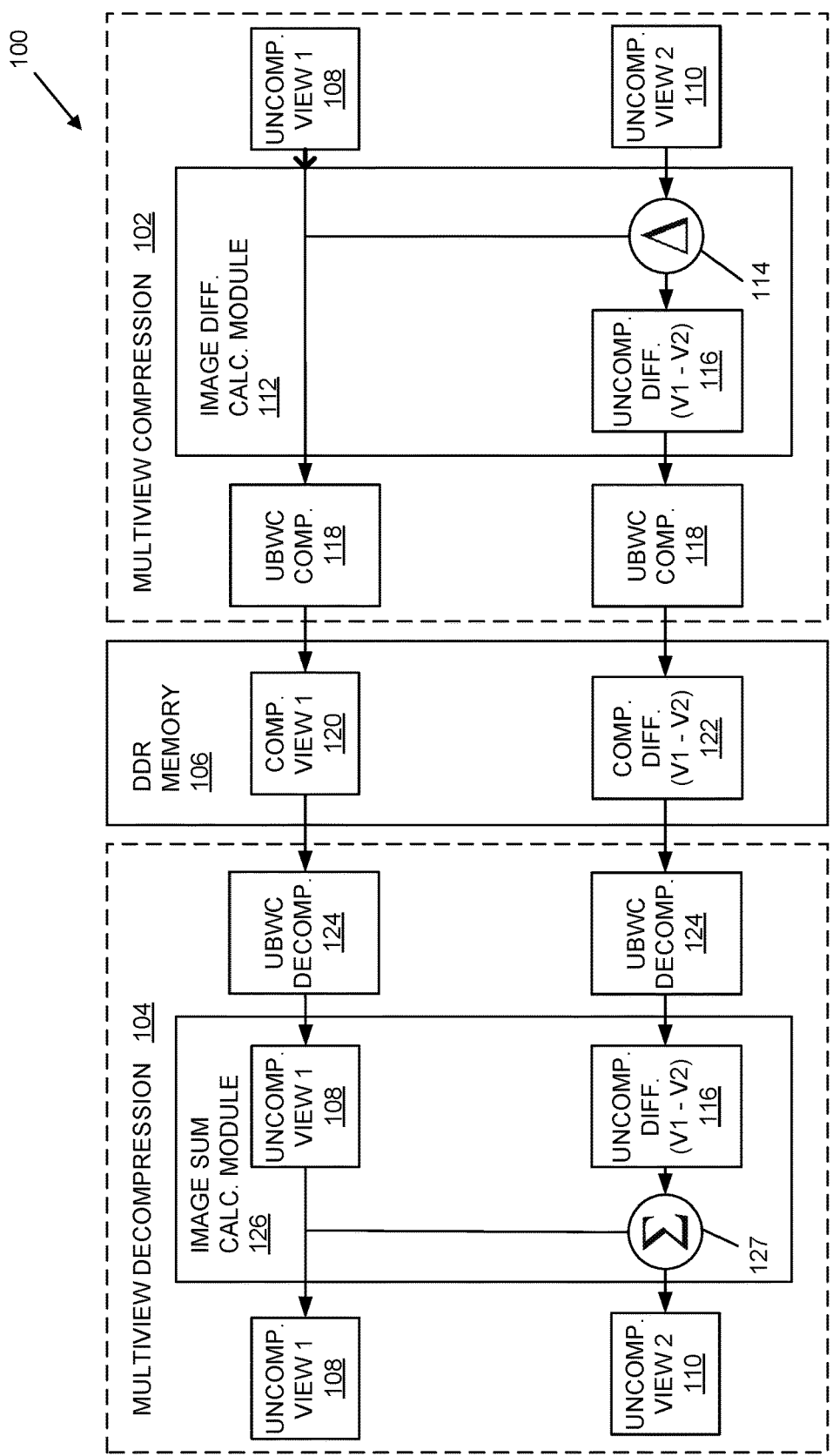
FIG. 1 is a block diagram of an embodiment of a compression/decompression system for reducing memory bandwidth in a graphics pipeline of a virtual reality (VR) or augment reality (AR) system.

FIG. 1 illustrates an embodiment of a system 100 for reducing memory bandwidth in a graphics pipeline of a virtual reality (VR) or augment reality (AR) system. It should be appreciated that the system 100 may be implemented in various types of VR and/or AR systems. For example, the system 100 may be incorporated in integrated VR and/or AR systems, such as, integrated headsets, goggles, and eyewear, projection systems, etc. In other embodiments, the system 100 may be incorporated in personal computers, laptop computers, gaming consoles, or portable computing devices, such as, smart phones, tablet computers, portable gaming consoles, etc., which may be integrated with a head mount kit or a head mount display (HMD) that is worn by a user. In this regard, it should be appreciated that one or more of components in the system 100 may be integrated into the HMD while others may be provided by an external processing system (e.g., a portable computing device) or external display (e.g., a computer display, a projection display, etc.).

As illustrated in FIG. 1, the system 100 comprises a double data rate (DDR) memory 106 electrically coupled to one or more processors in the graphics pipeline (e.g., a graphics processing unit (GPU), a display processor, etc.). As illustrated in FIG. 1, the DDR memory 106 does not store separate compressed versions of each view in the multiview rendering. For example, instead of storing both a compressed version of a right eye view and a compressed version of a left eye, the system 100 provides memory bandwidth and power savings by taking advantage of any similarity between the right eye view and the left eye view.

The system 100 comprises a multiview compression module 102 and a multiview decompression module 104 for performing the compression and decompression, respectively. As described below in more detail, the various components in the graphics pipeline (e.g., GPU 302, display processor 304, etc.) may implement one or both of the compression and decompression modules 102 and 104 depending on the nature of the graphics processing phase (e.g., eye buffer rendering phase, timewarp phase, display phase, etc.) and the type of display (e.g., single display versus dual display).

In the embodiment of FIG. 1, the multiview compression module 102 comprises an image differential calculation module 112 and one or more compression module(s), such as, for example, universal bandwidth compression (UBWC) compression module 118. In the embodiment illustrated in FIG. 1, compression and/or decompression may be performed via universal bandwidth compression/decompression (UBWC). UBWC compresses graphical buffers, such as GPU, video, and/or camera buffers. UBWC may work on a per-tile basis with a UBWC tile comprising a predetermined number of pixels (e.g., 4, 8, or more pixels). It should be appreciated that universal bandwidth compression may increase the effective bandwidth of the system, reduce the power consumption for the memory subsystem, (e.g., DDR, memory controller, data path, etc.), and reduce the power consumption of IP cores by making them run more efficiently and at lower voltage levels.

Referring to FIG. 1, the image differential calculation module 112 receives as inputs a first image and a second image. The first image comprises an uncompressed version of a first view 108 (e.g., one of a left eye view and a right eye view), and the second image comprises an uncompressed version of a second view 110 (e.g., the other of the left eye view and the right eye view). The first view 108 is compressed via UBWC compression module 118, which generates a compressed first view 120. The compressed first view 120 is stored in DDR memory 106. Rather than compressing the second view 110, the image differential calculation module 112 compares the second view 110 to the first view 108 to determine any distortions or differences between the two images. In an embodiment, the first view 108 and the second view 110 are provided to a delta image calculation component 114 to determine the differing data between the two images. In an embodiment, the delta image calculation component 114 may comprise a simple subtraction algorithm with the resulting output being another image that is a result of a pixel-by-pixel subtraction. For example, if pixel [x, y, Red] of view 1 has a value of pf 250 and pixel [x, y, Red] of view 2 has a value of pf 249, the resulting pixel [x, y, Red] for the output image will have a value of 1 equal to the difference between the values. It should be appreciated that alternative embodiments may employ other desirable linear operations for determining the difference between the two images. Referring to FIG. 1, the delta image calculation component 114 outputs an uncompressed difference (V1-V2) 116 between the first view 108 and the second view 110. The uncompressed difference 116 is provided to UBWC compression module 118, which generates a compressed version 122 of the difference (V1-V2) 116. The compressed version 122 of the difference (V1-V2) 116 is stored in DDR memory 106.

It should be appreciated that, because much of the image data between the first and second views 108 and 110 will be similar, the delta or difference determined by the delta image calculation component 114 may comprise a relatively large percentage of zero values. Therefore, when the uncompressed difference 116 is compressed by UBWC compression module 118, a relatively high compression ratio may be achieved, which results in memory bandwidth savings during the transfer to DDR memory 106.

During a subsequent stage in the graphics pipeline, the multiview decompression module 104 may retrieve the compressed version 122 of the difference (V1-V2) 116 and the compressed first view 120. Again with the relatively high compression ratio associated with the difference (V1-V2) 116, the system 100 again results in memory bandwidth savings during the retrieval from DDR memory 106. The compressed difference 122 and the compressed first view 120 are input to a UBWC decompression module 124, which generates the original uncompressed first view 108 and the original uncompressed difference 116 between the first and second views 108 and 110.

Figure 3A:
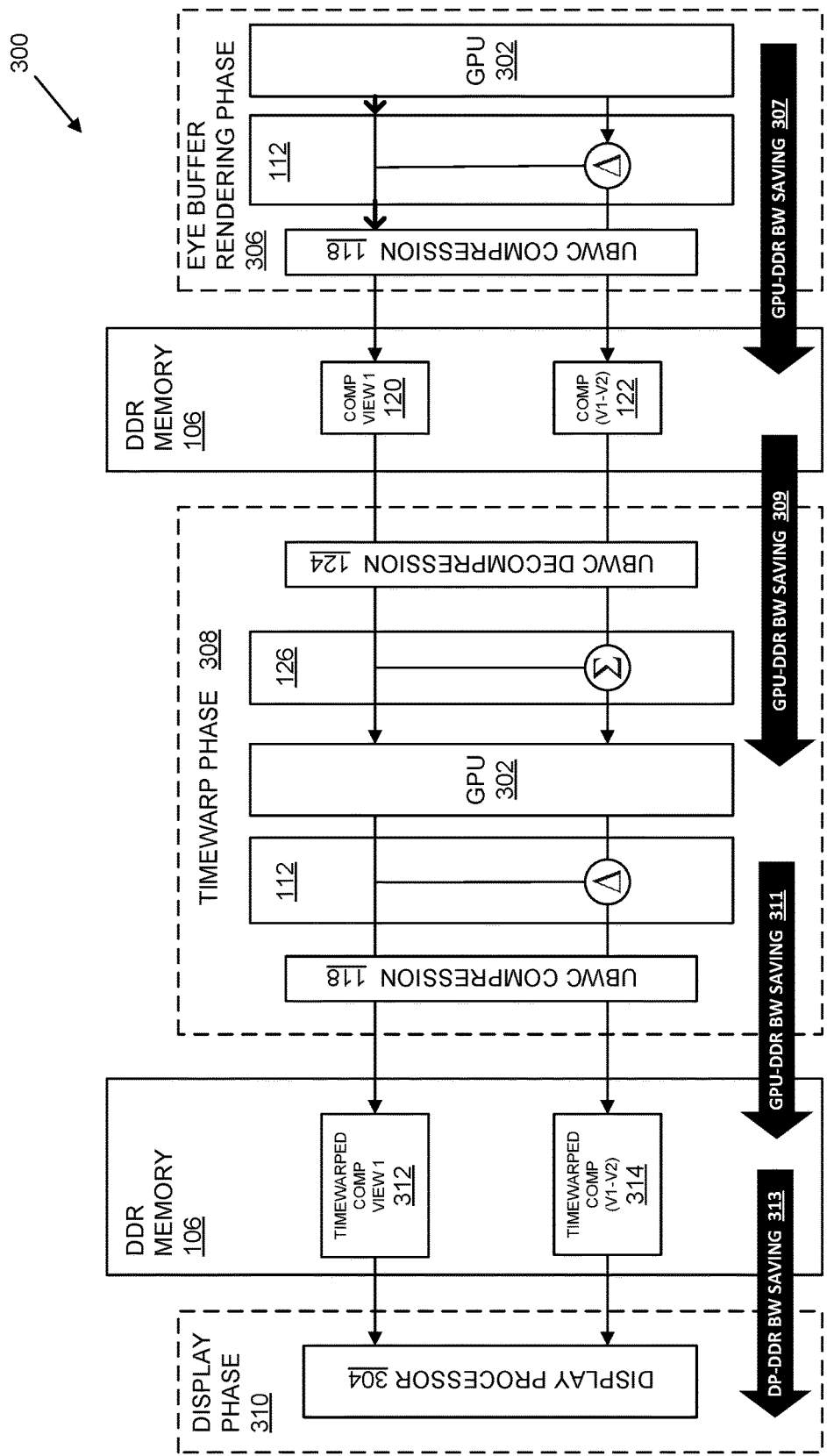
FIGS. 3a & 3b illustrate a block/flow diagram of an embodiment of dual-display VR/AR system for implementing the compression/decompression system of FIG. 1.
Figure 3B:
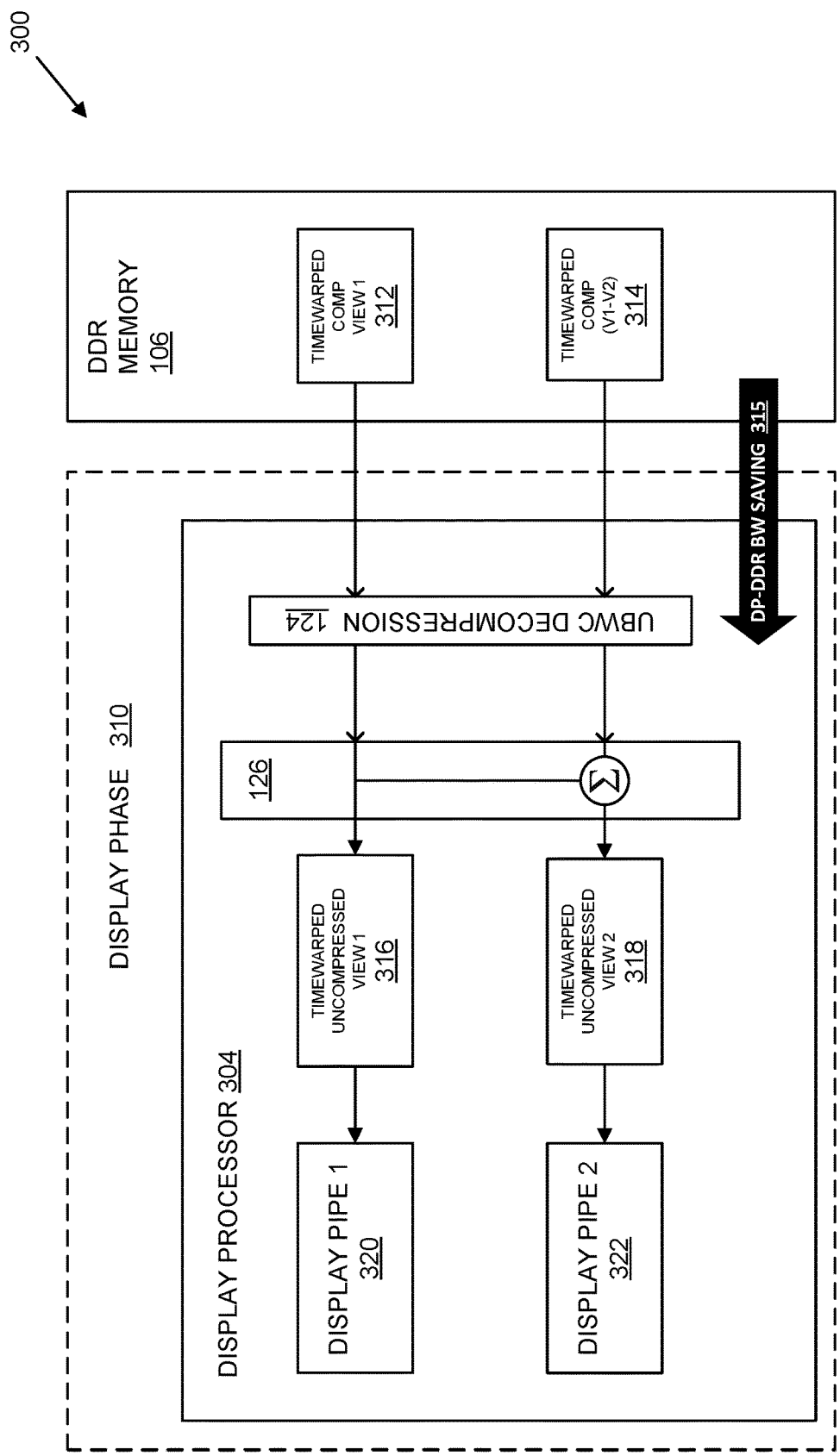
Figure 4:
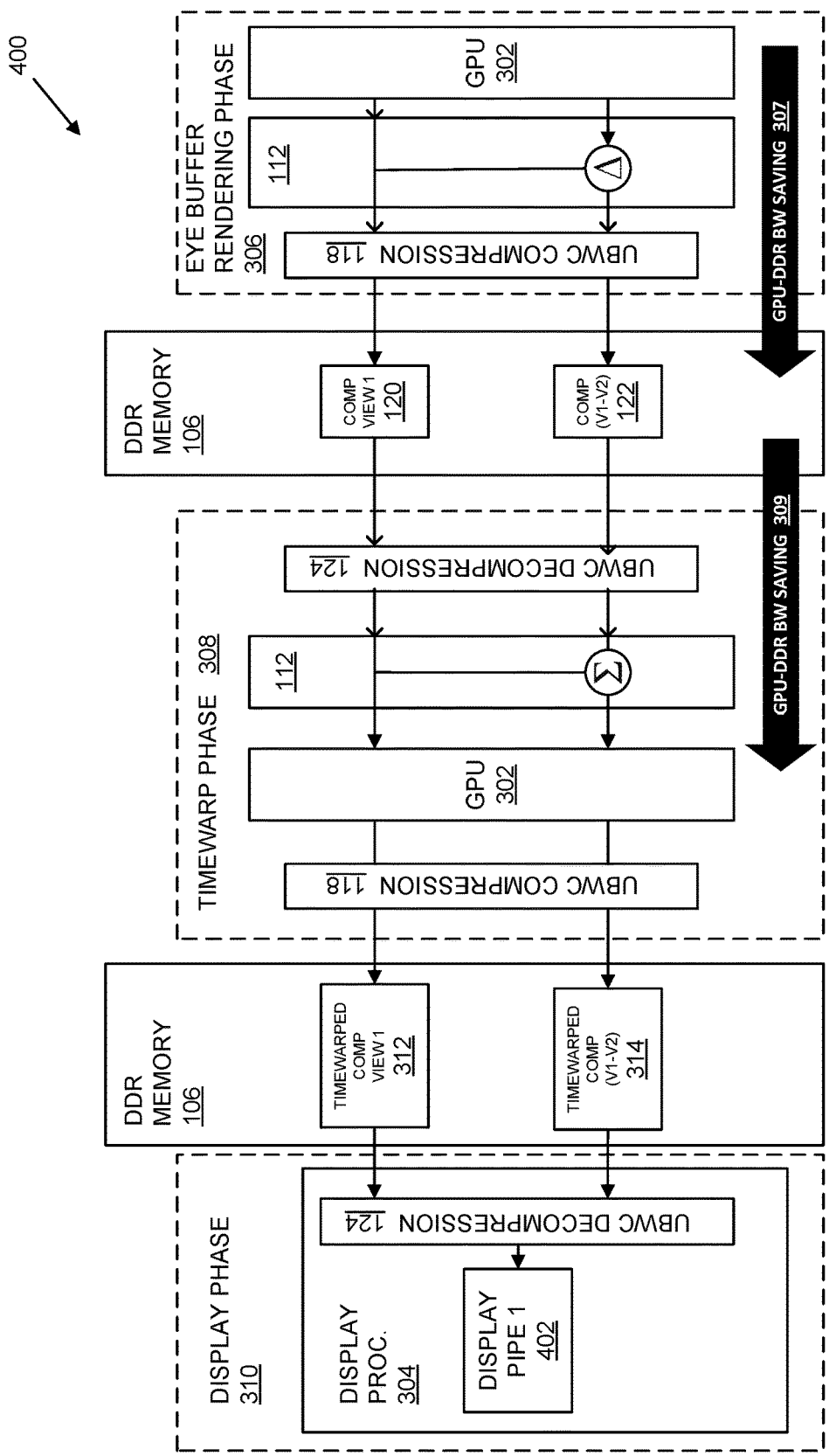
FIG. 4 illustrates a block/flow diagram of an embodiment of single-display VR/AR system for implementing the compression/decompression system of FIG. 1.

As further illustrated in FIG. 1, the multiview decompression module 104 may further comprise an image calculation summation module 126 in communication with UBWC decompression module(s) 124. The image calculation summation module 126 receives the original first view 108 and the original difference 116 from UBWC decompression module(s) 124, and generates the original second view 110 by comparing the difference 116 to the first view 108. It should be appreciated that the image summation calculation module 126 comprises the inverse of the image difference calculation operation performed by the module 112. For example, where the image difference calculation operation comprises a subtraction operation, as described above, the image summation calculation module 126 may perform an simple addition operation. As described below in more detail, it should be appreciated that the first and second views 108 and 110 may be further processed by the graphics pipeline, which may involve display to a single display VR device (FIG. 4) or a dual display VR device (FIGS. 3a and 3b) and/or further processing by a GPU 302 in a timewarp phase 308 (FIGS. 3a, 3b, and 4). Subsequent processing may involve further compression and decompression sequences using image differential calculation module 112 and image summation calculation module 126 with corresponding storage in DDR memory 106, which will result in further savings of memory bandwidth.

Figure 2:
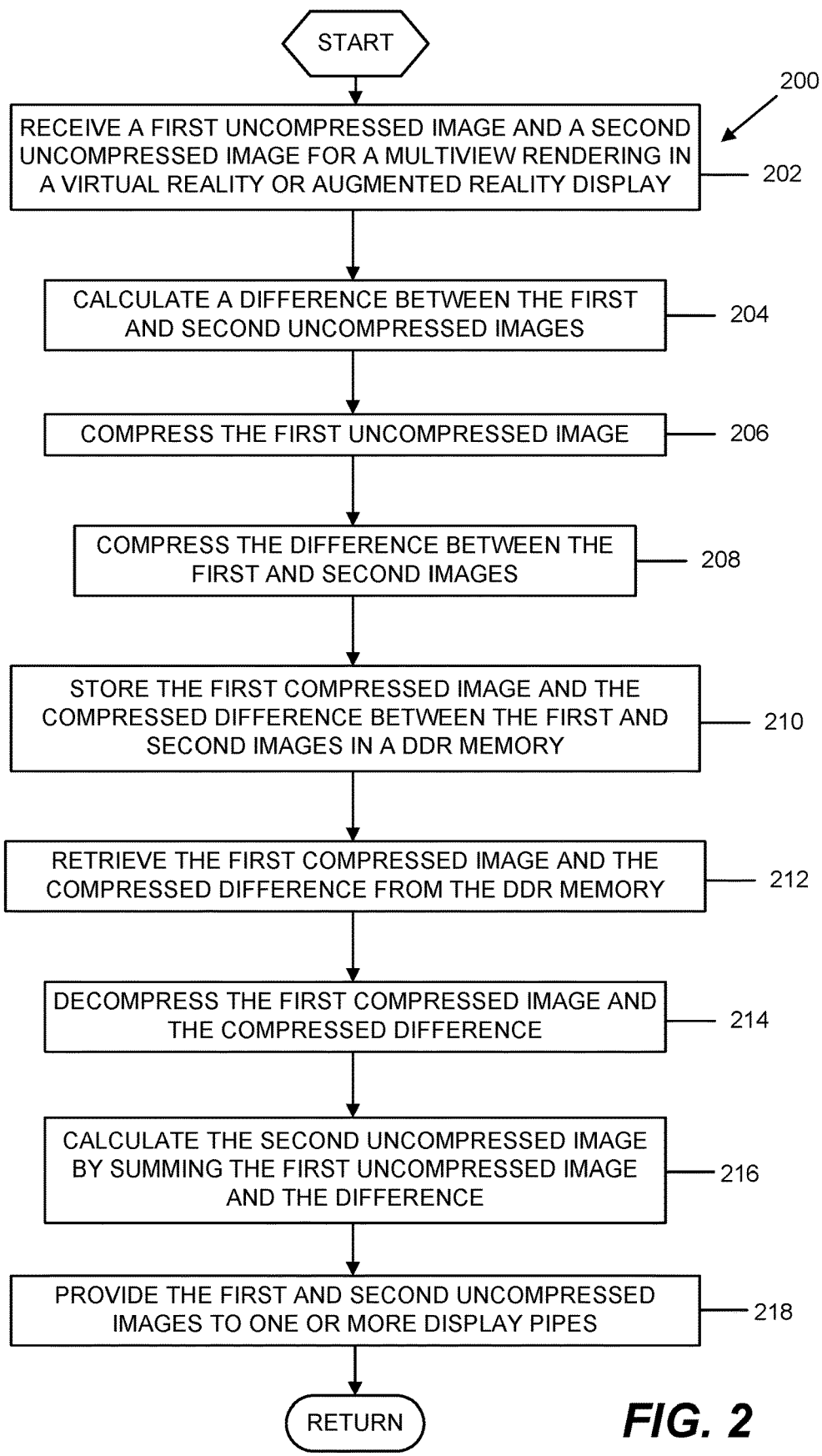
FIG. 2 is a flowchart illustrating an embodiment of a compression/decompression method for reducing memory bandwidth in a graphics pipeline of a VR/AR system.

FIG. 2 illustrates an embodiment of a compression/decompression method 200 for reducing memory bandwidth in a graphics pipeline of a VR/AR system. At block 202, the method 200 receives a first uncompressed image and a second uncompressed image for a multiview rendering in a VR or AR system. The first uncompressed image may correspond to one of a right eye view and a left eye view, and the second uncompressed image may correspond to the other of the right eye view and the left eye view. At block 204, the difference between the first and second uncompressed images may be calculated using, for example, the image differential calculation module 112 of system 100. At block 206, the first uncompressed image is compressed. At block 208, the difference between the first and second uncompressed images is compressed. It should be appreciated that any compression/decompression algorithm may be used. In an embodiment, the compression/decompression algorithms employed in the method 200 comprise a universal bandwidth compression (UBWC) module 118. At block 210, the first compressed image and the compressed difference between the first and second uncompressed images may be stored in memory, such as DDR memory 106. Prior to and/or during the storage of first compressed image and the compressed difference between the first and second uncompressed images in DDR memory 106, these two images may be optionally further compressed by, for example, the UBWC module 118.

As mentioned above, blocks 202, 204, 206, 208, and 210 may be performed by a first processor device (e.g., GPU 302) in a graphics pipeline during an eye rendering buffer rendering phase 306 or during a timewarp phase 308. Blocks 212, 214, 216, and 218 may be performed by the same processor device (e.g., GPU 302) in the same or another phase in the graphics pipeline or another processor device in the graphics pipeline, such as, the display processor 304.

At block 212, the first compressed image and the compressed difference between the first and second uncompressed images may be retrieved from the DDR memory 106. At block 214, the first compressed image is decompressed via, for example, a UBWC module. The compressed difference is also decompressed. At block 216, the content in the original uncompressed second image may be generated by an image summation operation 127 by comparing the first uncompressed image to the difference between the first and second uncompressed images. At block 218, the first and second uncompressed images, as output by the image summation operation 127, may be provided to one or more display pipes depending on whether the display is a single display or a dual display VR device.

As mentioned above, the system 100 may be incorporated in various types of VR/AR systems and devices. FIGS. 3a & 3b illustrate the compression/decompression system 100 implemented in an embodiment of a dual-display VR system 300. In this embodiment, the graphics pipeline comprises an eye buffer rendering phase 306, a timewarp phase 308, and a display phase 310. The eye buffer rendering phase 306 and the timewarp phase 308 are executed by a GPU 302. The display phase 310 is executed by a display processor 304.

As illustrated in FIG. 3b, the eye buffer rendering phase 302 involves a first instance of the multiview compression module 102 and UBWC compression 118 described above in connection with system 100 (FIG. 1). The result of the eye buffer rendering phase 302 is the storage in DDR memory 106 of the compressed first view 120 and the compressed difference 122 between the first and second uncompressed views 108 and 110. As illustrated by arrow 307, the use of multiview compression module 112 and UBWC compression 118 during the eye buffer rendering phase 306 may result in a GPU-to-DDR memory bandwidth saving. The eye buffer rendering phase 302 is followed by the timewarp phase 308.

As known in the art, a VR graphics pipeline may reduce motion-to-photon latency using a graphics rendering technique referred to as "timewarp", "reprojection", or "rerendering" (collectively referred to as "timewarp"). Timewarp involves warping the rendered image before sending it to the display to correct for the user's movement that occurred after the rendering. Timewarp may reduce latency and increase or maintain frame rate (i.e., the number of frames display per second (fps)). This process takes an already rendered image, modifies it with the predicted positional information based on the collected positional information obtained from sensors (e.g., sensor(s) housed in a HMD), and then displays the modified image on the VR display.

Without timewarp, the VR system would capture the data about the position of the user, render the image based on this positional data, and then display the image when the next scene is due. For example, in a 60 frames per second (fps) VR application, a new scene may be displayed once every 16.7 ms. Each image that is displayed is based on the positional data that was obtained approximately 16.7 ms ago. With timewarp, however, the VR system captures the positional data, renders the image based on the positional data, and before displaying the image the VR system captures updated positional data. Using the updated positional data, the rendered image is modified with appropriate algorithms to fit the latest position of the user, and then displayed to the user. In this manner, the modified image is more recent and more accurately reflects the position of the user at the time of the display than the image that was initially rendered.

As illustrated in FIG. 3a, the timewarp phase 308 may involve a first instance of the multiview decompression module 104 and UBWC decompression. In the decompression stage of the timewarp phase 308, the GPU 302 retrieves the compressed view 120 and the compressed difference 122 from the DDR memory 106 to determine the original first and second views. The GPU 302 may receive updated positional data, as described above, and modify the first and second views to fit the latest position of the user. The modified first and second views may be further processed via another instance of the multiview compression module 102 and UBWC compression. The result of the timewarp phase 302 is the storage in DDR memory 106 of a timewarped compressed first view 312, and a timewarped compressed difference between the modified first and second views. As illustrated by arrows 309 and 311, the use of multiview compression module 102 and the multiview decompression module 104 during the timewarp phase 308 may result in additional GPU-to-DDR memory bandwidth savings.

The timewarp phase 308 may be followed by the display phase 310, which is executed by the display processor 304. As illustrated in FIG. 3b, the display phase 310 may involve a further instance of the multiview decompression module 104 and UBWC decompression. The display processor 304 retrieves the timewarped compressed view 312 and the timewarped compressed difference 314 from the DDR memory 106. View 312 and difference 314 are decompressed by the UBWC module, and then used to determine the original timewarped, uncompressed views 316 and 318. The view 316 may be provided to a first display pipe 320 for a first display device, and the view 318 may be provided to a second display pipe 322 for the second display device. As illustrated by arrow 315, the use of multiview decompression module 104 during the display phase 310 may result in display-processor-to-DDR memory bandwidth saving.

In an exemplary embodiment, the display hardware may read the two views synchronously. For example, in the case of a dual-display VR system, the two views may be synchronously read, which may allow the timewarp to write out the frame buffer with multi-view compression enabled. It should be appreciated that, because the reads are synchronous from DDR memory 106, both the view 1 pixel values and the difference view pixel values may exist on the same buffer on the display device, and view 2 may be calculated on-chip without a need to go to DDR memory 106. To illustrate these advantages, it should be appreciated that in existing solutions in which the two views are ready by the display hardware in serial (e.g., single display phones), the timewarp cannot write the frame buffer with multi-view compression. This is because in order to calculate view 2, both the difference view and the view 1 pixel values are be read from DDR memory, which results into 2× read per pixel for view 2, which defeats the benefit and purpose of multi-view compression, which is to reduce memory traffic BW.

FIG. 4 illustrates the compression/decompression system 100 implemented in an embodiment of a single-display VR system 400. As mentioned above, FIG. 3 illustrates an embodiment in which the display read is synchronous between the two views. As a result, the timewarp write and display read operation benefit from multi-view compression. FIG. 4 shows a case where the display read is not synchronous between the two views. It should be appreciated that in a single-display embodiment because the display read is not synchronous, the view 1 and the difference view may both be needed to extract view 2, which may yield 2 pixel read from DDR memory 106 per one pixel in view 2. By contrast, in the synchronous mode illustrated in FIG. 3, the view 1 may be already available in the chip.

Figure 5:
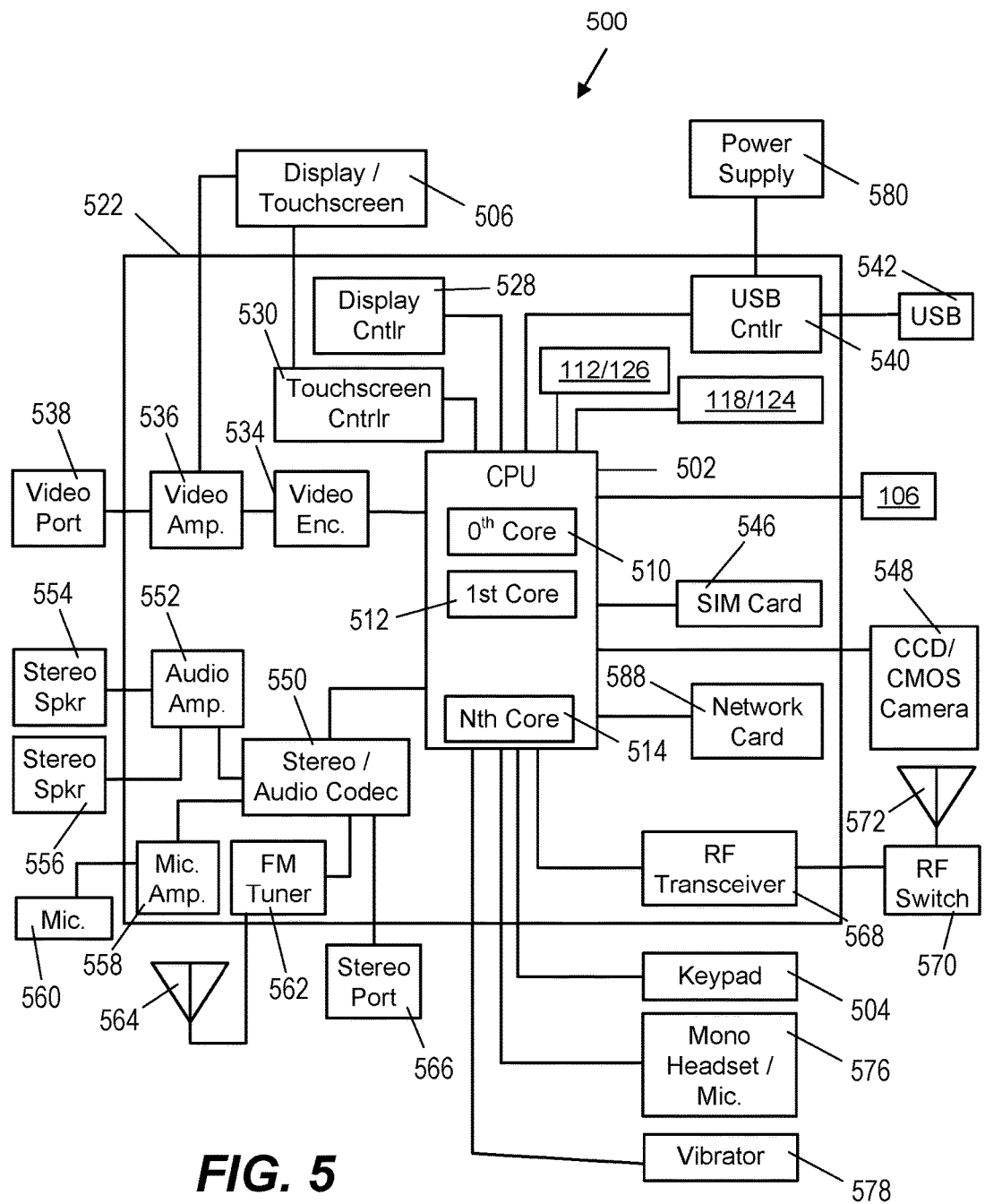
FIG. 5 is a block diagram of an embodiment of a portable computing device in which the compression/decompression systems and methods of FIGS. 1-4 may be implemented.

As mentioned above, the system 100 may be incorporated into any desirable computing system. FIG. 5 illustrates an embodiment in which one or more components of the system 100 are incorporated in an exemplary portable computing device (PCD) 500. PCD 500 may comprise a smartphone, a tablet computer, a wearable device (e.g., HMD 200). It will be readily appreciated that certain components of the system 100 are included on the SoC 522 (e.g., multiview compression module 102 and multiview decompression module 104) while other components (e.g., the DDR memory 106) are external components coupled to the SoC 522. The SoC 522 may include a multicore CPU 502. The multicore CPU 502 may include a zeroth core 510, a first core 512, and an Nth core 514. One of the cores may comprise, for example, a graphics processing unit (GPU) with one or more of the others comprising the CPU.

A display controller 528 and a touch screen controller 530 may be coupled to the CPU 502. In turn, the touch screen display 505 external to the on-chip system 522 may be coupled to the display controller 528 and the touch screen controller 530.

FIG. 5 further shows that a video encoder 534, e.g., a phase alternating line (PAL) encoder, a sequential color a memoire (SECAM) encoder, or a national television system (s) committee (NTSC) encoder, is coupled to the multicore CPU 502. Further, a video amplifier 536 is coupled to the video encoder 534 and the touch screen display 506. Also, a video port 538 is coupled to the video amplifier 536. As shown in FIG. 5, a universal serial bus (USB) controller 540 is coupled to the multicore CPU 502. Also, a USB port 542 is coupled to the USB controller 540. Memory 104 and a subscriber identity module (SIM) card 546 may also be coupled to the multicore CPU 502.

Further, as shown in FIG. 5, a digital camera 548 may be coupled to the multicore CPU 502. In an exemplary aspect, the digital camera 548 is a charge-coupled device (CCD) camera or a complementary metal-oxide semiconductor (CMOS) camera.

As further illustrated in FIG. 5, a stereo audio coder-decoder (CODEC) 550 may be coupled to the multicore CPU 502. Moreover, an audio amplifier 552 may be coupled to the stereo audio CODEC 550. In an exemplary aspect, a first stereo speaker 554 and a second stereo speaker 556 are coupled to the audio amplifier 552. FIG. 5 shows that a microphone amplifier 558 may be also coupled to the stereo audio CODEC 550. Additionally, a microphone 560 may be coupled to the microphone amplifier 558. In a particular aspect, a frequency modulation (FM) radio tuner 562 may be coupled to the stereo audio CODEC 550. Also, an FM antenna 564 is coupled to the FM radio tuner 562. Further, stereo headphones 566 may be coupled to the stereo audio CODEC 550.

FIG. 5 further illustrates that a radio frequency (RF) transceiver 568 may be coupled to the multicore CPU 502. An RF switch 570 may be coupled to the RF transceiver 568 and an RF antenna 572. A keypad 204 may be coupled to the multicore CPU 502. Also, a mono headset with a microphone 576 may be coupled to the multicore CPU 502. Further, a vibrator device 578 may be coupled to the multicore CPU 502.

FIG. 5 also shows that a power supply 580 may be coupled to the on-chip system 522. In a particular aspect, the power supply 580 is a direct current (DC) power supply that provides power to the various components of the PCD 500 that require power. Further, in a particular aspect, the power supply is a rechargeable DC battery or a DC power supply that is derived from an alternating current (AC) to DC transformer that is connected to an AC power source.

FIG. 5 further indicates that the PCD 500 may also include a network card 588 that may be used to access a data network, e.g., a local area network, a personal area network, or any other network. The network card 588 may be a Bluetooth network card, a WiFi network card, a personal area network (PAN) card, a personal area network ultra-low-power technology (PeANUT) network card, a television/cable/satellite tuner, or any other network card well known in the art. Further, the network card 588 may be incorporated into a chip, i.e., the network card 588 may be a full solution in a chip, and may not be a separate network card 588.

As depicted in FIG. 5, the touch screen display 506, the video port 538, the USB port 542, the camera 548, the first stereo speaker 554, the second stereo speaker 556, the microphone 560, the FM antenna 564, the stereo headphones 566, the RF switch 570, the RF antenna 572, the keypad 574, the mono headset 576, the vibrator 578, and the power supply 580 may be external to the on-chip system 522.

It should be appreciated that one or more of the method steps described herein may be stored in the memory as computer program instructions, such as the modules described above. These instructions may be executed by any suitable processor in combination or in concert with the corresponding module to perform the methods described herein.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, NAND flash, NOR flash, M-RAM, P-RAM, R-RAM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Alternative embodiments will become apparent to one of ordinary skill in the art to which the invention pertains without departing from its spirit and scope. For example, it should be appreciated that the multi-view compression/decompression methods described above may be applied to various types of multimedia cores and applications, such as, foe example, a camera supporting stereo input, a video decode supporting stereo video decode, and an encoder supporting stereo camera encoding. Therefore, although selected aspects have been illustrated and described in detail, it will be understood that various substitutions and alterations may be made therein without departing from the spirit and scope of the present invention, as defined by the following claims.

What is claimed is:

1. A compression method for a multiview rendering in a graphics pipeline, the method comprising:
   receiving a first image and a second image for a multiview rendering;
   calculating a difference between the first and second images;
   compressing the first image and the difference between the first and second images;
   storing the compressed first image and the compressed difference between the first and second images in a memory;
   retrieving the compressed first image and the compressed difference from the memory;
   applying a timewarp to generate a timewarped compressed first image and a timewarped compressed difference;
   decompressing the timewarped compressed first image and the timewarped compressed difference to generate a timewarped first image and a timewarped difference;
   generating a timewarped second image by comparing the timewarped first image to the timewarped difference;
   providing the timewarped first image to a first display pipe; and
   providing the timewarped second image to a second display pipe.

2. The method of claim 1, wherein the memory comprises a double data rate (DDR) memory electrically coupled to a graphics processing unit (GPU) via a DDR bus.

3. The method of claim 1, wherein one of the first and second images comprises a left eye view and the other of the first and second images comprises a right eye view.

4. The method of claim 1, wherein the calculating the difference between the first and second images is performed during an eye rendering phase by a graphics processing unit (GPU) electrically coupled to the memory.

5. The method of claim 4, wherein applying the timewarp comprises:
   decompressing the compressed first image to generate the first image;
   decompressing the compressed difference to generate the difference;
   generating the second image by comparing the first image to the difference;
   timewarping the first image to generate a timewarped first image;
   timewarping the second image to generate a timewarped second image;
   calculating a difference between the timewarped first image and the timewarped second image;
   compressing the timewarped first image to generate the timewarped compressed first image; and
   compressing the timewarped difference to generate the timewarped compressed difference.

6. A system for compressing/decompressing a multiview rendering in a graphics pipeline, the system comprising:
    means for receiving a first image and a second image for a multiview rendering;
    means for calculating a difference between the first and second images;
    means for compressing the first image and the difference between the first and second images;
    means for sending the compressed first image and the compressed difference between the first and second images to a memory;
    means for retrieving the compressed first image and the compressed difference from the memory;
    means for applying a timewarp to generate a timewarped compressed first image and a timewarped compressed difference;
    mean for decompressing the timewarped compressed first image and the timewarped compressed difference to generate a timewarped first image and a timewarped difference;
    means for generating a timewarped second image by comparing the timewarped first image to the timewarped difference;
    means for providing the timewarped first image to a first display pipe; and
    means for providing the timewarped second image to a second display pipe.

7. The system of claim 6, wherein the memory comprises a double data rate (DDR) memory electrically coupled to a graphics processing unit (GPU) via a DDR bus.

8. The system of claim 6, wherein one of the first and second images comprises a left eye view and the other of the first and second images comprises a right eye view.

9. The system of claim 6, wherein the means for calculating the difference between the first and second images comprises a graphics processing unit (GPU) electrically coupled to the memory.

10. The system of claim 9, wherein the means for generating the timewarped second image by comparing the timewarped first image to the timewarped difference comprises one of the GPU and a display processor electrically coupled to the memory.

11. A computer system for compressing/decompressing a multiview rendering in a graphics pipeline, the computer system comprising:
    a double data rate (DDR) memory;
    a multiview compression module comprising logic configured to: calculate a difference between a first image and a second image for a multiview rendering; compress the first image and the difference between the first and second images; and store the compressed first image and the compressed difference between the first and second images;
    a multiview timewarp module comprising logic configured to:
        retrieve the compressed first image and the compressed difference from the memory;
        apply a timewarp to generate a timewarped compressed first image and a timewarped compressed difference;
    a multiview decompression module comprising logic configured to: decompress the timewarped compressed first image and the timewarped compressed difference stored in the memory to generate a timewarped first image and a timewarped difference; and generate a timewarped second image by comparing the timewarped first image to the timewarped difference;
    a first display pipe for receiving the timewarped first image; and
    a second display pipe for receiving the timewarped second image.

12. The computer system of claim 11, wherein the multiview compression module is executed by a graphics processing unit (GPU) during an eye buffer rendering phase, and the multiview timewarp module is executed by the GPU during a timewarp phase.

13. The computer system of claim 11, wherein the multiview compression module is executed by a graphics processing unit (GPU), and the multiview decompression module is executed by a display processor.

14. The computer system of claim 11 incorporated in a portable computing device.

15. The computer system of claim 14 incorporated in a gaming console.

16. The computer system of claim 11, wherein the multiview compression module and the multiview decompression module comprise a universal bandwidth compression module.

17. The computer system of claim 11 incorporated in a dual display virtual reality device.

18. The computer system of claim 11, wherein one of the first and second images comprises a left eye view and the other of the first and second images comprises a right eye view.

19. A computer system for compressing/decompressing a multiview rendering in a graphics pipeline, the computer system comprising:
    a double data rate (DDR) memory;
    a graphics processing unit (GPU) electrically coupled to the DDR memory, the GPU comprising:
        an image differential calculation module configured to calculate a difference between a first image and a second image for a multiview rendering; and
        a multiview compression module configured to: compress the first image and the difference between the first and second images; and store the compressed first image and the compressed difference in the DDR memory;
        a multiview timewarp module configured to:
            retrieve the compressed first image and the compressed difference from the DDR memory;
            apply a timewarp to generate a timewarped compressed first image and a timewarped compressed difference;
        a multiview decompression module configured to: decompress the timewarped compressed first image and the timewarped compressed difference stored in the DDR memory and then provide the timewarped first image to a first display pipe; and
        an image summation calculation module in communication with the multiview decompression module and configured to generate a timewarped second image by comparing the timewarped first image to the timewarped difference and then provide the timewarped second image to a second display pipe.

20. The computer system of claim 19, wherein the multiview compression module and the multiview timewarp module are executed by the GPU during a timewarp phase of a graphics pipeline.

21. The computer system of claim 19, wherein the multiview compression module is executed by the GPU during an eye buffer rendering phase, and the multiview decompression module is executed during a display phase.

22. The computer system of claim 19, wherein one of the first and second images comprises a left eye view and the other of the first and second images comprises a right eye view.

23. The computer system of claim 19, wherein the multiview compression module and the multiview decompression module comprise a universal bandwidth compression module.

24. The computer system of claim 19 incorporated in a dual display virtual reality device.

* * * * *